United States Patent [19]
Kaido et al.

[11] Patent Number: 6,136,123
[45] Date of Patent: *Oct. 24, 2000

[54] PROCESS OF PRODUCTION OF PNEUMATIC TIRE

[75] Inventors: Hiroyuki Kaido; Kazuto Yamakawa; Jiro Watanabe; Noriaki Kuroda; Gou Kawaguchi, all of Hiratsuka, Japan

[73] Assignee: The Yokohama Rubber Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/765,425
[22] PCT Filed: Apr. 15, 1996
[86] PCT No.: PCT/JP96/01031
§ 371 Date: Dec. 31, 1996
§ 102(e) Date: Dec. 31, 1996
[87] PCT Pub. No.: WO96/34736
PCT Pub. Date: Jul. 11, 1996

[30] Foreign Application Priority Data

May 2, 1995 [JP] Japan ..................................... 7-108666

[51] Int. Cl.[7] .............................. B60C 5/14; B29D 30/08
[52] U.S. Cl. ............................................ 156/123; 152/510
[58] Field of Search ..................................... 156/133, 123, 156/110.1; 152/510, DIG. 16

[56] References Cited

U.S. PATENT DOCUMENTS

| | | | |
|---|---|---|---|
| 4,130,534 | 12/1978 | Coran et al. | 525/133 |
| 4,200,579 | 4/1980 | Pennings | 524/508 |
| 4,502,520 | 3/1985 | Sandstrom | 152/510 |
| 4,928,741 | 5/1990 | Rye et al. | 152/510 |
| 5,040,583 | 8/1991 | Lin et al. | 152/510 |
| 5,228,938 | 7/1993 | Kansupada et al. | 156/307.3 |
| 5,443,104 | 8/1995 | Dollinger et al. | 152/510 |
| 5,738,158 | 4/1998 | Ozawa et al. | 152/510 |

FOREIGN PATENT DOCUMENTS

| | | |
|---|---|---|
| 0 552 620 | 7/1993 | European Pat. Off. . |
| 633152 | 1/1995 | European Pat. Off. ............... 152/510 |
| 5-169909 | 7/1993 | Japan . |
| 5-170935 | 7/1993 | Japan . |
| 6-40207 | 2/1994 | Japan . |
| 7-52605 | 2/1995 | Japan . |

OTHER PUBLICATIONS

Kirk–Othmer, Encyclopedia of Chemical Technology, 4th ed., vol. 1, "Adhesives", pp. 445–466, 1991.
English Language Abstract for JP 06–184,327; Jul. 5, 1994.

*Primary Examiner*—Geoffrey L. Knable
*Attorney, Agent, or Firm*—Finnegan, Henderson, Farabow, Garrett & Dunner, L.L.P.

[57] ABSTRACT

A process for producing a pneumatic tire using, as an air permeation preventive layer, a strip-shaped or cylindrical-shaped single-layer or multiple-layer thermoplastic film, comprising:

applying, to at least a part of the joining portion of the thermoplastic film or tire member facing the thermoplastic film, a tackifier-adhesive composition containing a polymer component having an absolute value of the difference of the critical surface tension with the rubber component of the tire member and the polymer component of the surface layer of the thermoplastic film of not more than 6 mN/m, respectively.

10 Claims, 1 Drawing Sheet

Fig.1

PROCESS OF PRODUCTION OF PNEUMATIC TIRE

TECHNICAL FIELD

The present invention relates to a process for producing a pneumatic tire using a thermoplastic film for an inner liner of the tire which lightens the weight of the tire, without detracting from the retention of air in the tire and reduces a defect rate of the tire and improves the working efficiency during the production of tire.

BACKGROUND ART

Reduction of fuel consumption is one of the major technical issues in automobiles. As one of the means for this issue, strong demands have been made for reduction of the weight of pneumatic tires. In this regard, an inner liner layer or other air permeation preventive layer comprised of a halogenated butyl rubber or other rubber having low air permeability is conventionally provided at the inner surface of the pneumatic tire to hold the air pressure in the tire constant. However, a halogenated butyl rubber has a large hysteresis loss, and therefore, after vulcanization of the tire, when rippling is caused in the rubber of the inner surface of the carcass layer and the inner liner layer in the spaces between the carcass cords, the inner liner layer deforms along with deformation of the carcass layer. Thus, there is the problem of an increase in the rolling resistance. Therefore, in general, a rubber sheet called a "tie rubber" having a small hysteresis loss has been inserted between the inner liner layer (e.g., halogenated butyl rubber) and rubber of the inner surface of the carcass layer for joining the both layers. Accordingly, in addition to the thickness of the inner liner layer of the halogenated butyl rubber, the thickness of the tie rubber is added and the overall layer becomes a thickness of more than 1 mm (1,000 μm). As a result, this has become a factor increasing the weight of the final tire.

Techniques have been proposed for using various materials in place of the butyl rubber or other low air permeability rubber as an air permeation preventive layer, such as the liner layer, of a pneumatic tire. For example, Japanese Unexamined Patent Publication (Kokai) No. 6-40207 proposes the formation of a thin film from an air permeation preventive layer at the inside of the tire by laminating a low air permeability layer comprised of a polyvinylidene chloride film or ethylenevinyl alcohol copolymer film and an adhesive layer comprised of a polyolefinic film, aliphatic polyamide film, or polyurethane film and laminating that thin film on the inner surface of a green tire comprised of unvulcanized rubber so that the adhesive layer contacts the carcass layer, then vulcanizing and molding the green tire. By using this multilayer film for the air permeation preventive layer, it is possible to reduce the thickness of the air permeation preventive layer from the past and possible to reduce the weight of the tire without detracting from the retention of the air pressure.

However, while a pneumatic tire using such a thermoplastic film as disclosed in Japanese Unexamined Patent Publication (Kokai) No. 6-40207 for the inner liner is superior in performance, it has problems in terms of the working efficiency and manufacturing cost and also problems in the occurrence of wrinkles, blistering, etc. at the time of adhesion of the thermoplastic film which has resulted in defective tires. Further, one method of adhering the thermoplastic film is to first manufacture the green tire, then adhere a strip of film to the inner surface or wrap the strip of film and carcass together around the molding drum and then inflate them. In these methods, however, when the adhesive strength at the splice portion of the film is poor, the splice portion (i.e., joined portion) will open up (splice opening) at the time of vulcanization of the tire or the work will be troublesome when manufacturing the green tire and therefore the work efficiency will be poor.

SUMMARY OF THE INVENTION

Accordingly, the object of the present invention is to provide a process for producing a pneumatic tire which eliminates the problems in a pneumatic tire using the above thermoplastic film as the air permeation preventive layer of the tire, coats a tackifier-adhesive at the splice portion of the film and/or the joining surfaces of the film and carcass to eliminate the problem of splice opening at the time of tire production, whereby the working efficiency is improved.

In accordance with the present invention, there is provided a process for producing a pneumatic tire using, as an air permeation preventive layer, a strip-shaped or cylindrical-shaped single-layer or multiple-layer thermoplastic film, comprising:

applying, to at least a part of the joining portion of the thermoplastic film or tire member facing the thermoplastic film, a tackifier-adhesive composition containing a polymer component having an absolute value of the difference of the critical surface tension with the rubber component of the tire member and the polymer component of the surface layer of the thermoplastic film of not more than 6 mN/m, respectively.

BRIEF DESCRIPTION OF THE DRAWINGS

The present invention will now be explained in further detail with reference to the drawings, wherein.

DETAILED DESCRIPTION OF THE INVENTION

The constitution, mode of operation, and effects of the present invention will now be explained in further detail.

In the process for producing a pneumatic tire according to the present invention, a strip-shaped or cylindrical-shaped single-layer or multiple-layer thermoplastic film is used as the air permeation preventive layer. This strip-shaped or join-less cylindrical-shaped single-layer or multiple-layer thermoplastic film can be produced, for example, by extruding any thermoplastic film having a low air permeability to a desired thickness. The process of production of such an air permeation preventive layer is, for example, described in further detail in the specifications of Japanese Unexamined Patent Publication (Kokai) No. 6-40207 or Japanese Patent Application No. 7-66341.

The film comprising the air permeation preventive layer of the pneumatic tire according to the present invention has an air permeation rate of not more than $25 \times 10^{-12}$ cc•cm/cm$^2$•sec•cmHg, preferably not more than $5 \times 10^{-12}$ cc•cm/cm$^2$•sec•cmHg and a Young's modulus of 1 to 500 MPa, preferably 10 to 300 MPa. The thickness of the film is 0.02 to 1 mm, preferably 0.05 to 0.5 mm. An air permeation rate of more than $25 \times 10^{-12}$ cc•cm/cm$^2$•sec•cmHg is not preferred from the viewpoint of lightening the weight of the pneumatic tire. Further, when the Young's modulus is too low, the work efficiency is reduced due to wrinkles etc. at the time of molding the tire, while conversely when too high, there is the problem that the deformation of the tire during use cannot be followed properly.

The thermoplastic resin usable for the thermoplastic film may be made of any material having the desired action of preventing the permeation of air. Examples of such a thermoplastic resin are the following thermoplastic resins and any resin mixtures thereof or those containing these.

Polyamide resins (for example, nylon 6 (N6), nylon 66 (N6), nylon 46 (N46), nylon 11 (N11), nylon 12 (N12), nylon 610 (N610), nylon 612 (N612), nylon 6/66 copolymer (N6/N66), nylon 6/66/610 copolymer (N6/66/610), nylon MXD (MXD6), nylon 6T, nylon 6/6T copolymer, nylon 66/PP copolymer, and nylon 66/PPS copolymer), polyester resins (for example, polybutylene terephthalate (PBT), polyethylene phthalate (PET), polyethylene isophthalate (PEI), PET/PEI copolymers, polyacrylate (PAR), polybutylene naphthalate (PBN), liquid crystal polyester, polyoxyalkylene diimido diacid/polybutyrate terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymers, methacrylonitrile/stryene/butadiene copolymers), polymethacrylate resins (for example, polymethyl methacrylate (PMMA), polyethyl methacrylate), polyvinyl resins (for example, vinyl acetate, polyvinyl alcohol (PVA), vinyl alcohol/ethylene copolymer (EVOH), polyvinylidene chloride (PDVC), polyvinyl chloride (PVC), polyvinyl/polyvinylidene chloride copolymer, polyvinylidene chloride/methyl acrylate copolymer), cellulose resins (for example, cellulose acetate, cellulose acetobutyrate), fluororesins (for example, polyvinylidene fluoride (PVDF), polyvinyl fluoride (PVP), polychlorofluoroethylene (PCTFE), tetrafluoroethylene/ethylene copolymer (ETFE)), imide resins (for example, aromatic polyimide (PI)), etc. may be mentioned.

The film of the thermoplastic resin used may be a single-layer or a multiple-layer film comprised of a film of the above-mentioned air permeation preventive resin on whose two surfaces are provided adhesive layers of a polyolefinic, aliphatic polyamide, or urethane type resin as described in Japanese Unexamined Patent Publication (Kokai) No. 6-40207 or, further, a film comprised by dispersing in a matrix of another thermoplastic resin a flat oriented polymer made from a single low air permeability thermoplastic resin produced by extruding and drawing a blend of at least two types of low compatibility thermoplastic resins, as described in Japanese Patent Application No. 7-55929 filed by the present application on Mar. 15, 1995. Further, to impart pliability to these thermoplastic resins, it is possible to use a film produced by extruding a blend of Japanese Patent Application No. 7-8394 filed by the present applicant on Jan. 23, 1995 containing any elastomer component and using the elastomer component as the domain and the resin layer as the matrix. The elastomer used as the domain of this blend may be suitably mixed in to an extent where the air permeability of the film does not exceed $25 \times 10^{-12}$ cc•cm/cm$^2$•sec•cmHg. Examples of the elastomer are as follows:

Diene rubbers and their hydrogenation products thereof (e.g., NR, IR, epoxylated natural rubber, SBR, BR (high cis-BR and low-cis BR), NBR, hydrogenated NBR, hydrogenated SBR), olefin rubbers (for examples, ethylene propylene rubber (EPDM, EPM), maleic acid modified ethylene propylene rubber (M-EPM), butyl rubber (IIR), isobutylene and aromatic vinyl or diene monomer copolymers, acryl rubbers (ACM), ionomers, halogenated rubbers (for example, Br-IIR, Cl-IIR, bromide of isobutylene paramethylstyrene copolymer (Br-IPMS), chloroprene rubber (CR), chlorohydrin rubber (CHC, CHR), chlorosulfonated polyethylene (SCM), chlorinated polyethylene (CM), maleic acid modified chlorinated polyethylene (M-CM), silicone rubbers (for example, methylvinyl silicone rubber, dimethyl silicone rubber, methylphenylvinyl silicone rubber), sulfur-containing rubber (e.g., polysulfide rubber), fluororubber (e.g., vinylidene fluoride rubber, fluorine-containing vinylether rubber, tetrafluoroethylene propylene rubber, fluorine-containing silicone rubber, fluorine-containing phosphagen rubber), thermoplastic elastomers (e.g., styrene elastomers, olefin elastomers, polyester elastomers, urethane elastomers, polyamide elastomers), etc. The elastomer may be cross-linked or not cross-linked.

The method for producing the blend consists of melting and kneading the thermoplastic resin and elastomer (in the case of rubber, the unvulcanized rubber) in advance by a biaxial kneader/extruder etc. to disperse the elastomer component in the thermoplastic resin forming the continuous phase. When vulcanizing the elastomer component, a vulcanization agent is added, while kneading, and the elastomer component is dynamically vulcanized. Further, the various compounding agents (except vulcanization agent) for the thermoplastic resin or elastomer component may be added during the above kneading, but preferably are mixed in advance before the kneading. The kneader used for kneading the thermoplastic resin and the elastomer component is not particularly limited. Examples thereof are a screw extruder, kneader, Banbury mixer, biaxial kneader/extruder, etc. Among these, it is preferable to use a biaxial kneader/extruder for the kneading of the thermoplastic resin and the elastomer and the dynamic vulcanization of the elastomer component. Further, two or more types of kneaders may be used for successive kneading. As the conditions for the melting and kneading, the temperature should be at least the temperature where the thermoplastic resin melts. Further, the shear rate at the time of kneading is preferably 1000 to 7500 sec$^{-1}$. The time for the overall kneading is from 30 seconds to 10 minutes. Further, when adding a vulcanization agent, the vulcanization time after addition is preferably 15 seconds to 5 minutes. The polymer composition produced by the above method is then extruded or calendered into a film. The method of forming the film may be a usual method of forming a film from a thermoplastic resin or thermoplastic elastomer. The film may be a strip or cylinder in shape.

The material of the rubber layer to which the air permeation preventive layer is laminated according to the present invention is not particularly limited. Any rubber material which has been generally used in the past as a rubber material for tires may be used. Examples of such a rubber, are a rubber composition comprising, a diene rubber such as, NR, IR, BR, SBR, a halogenated butyl rubber, as ethylene-propylene copolymer rubber, a styrene elastomer, etc. to which additives such as carbon black, process oil, vulcanizers, have been added.

According to the present invention, as explained above, when producing a pneumatic tire using, as an air permeative preventive layer, a strip-shaped or cylindrical-shaped single-layer or multiple-layer thermoplastic film, at least, a part of the joining portion of the thermoplastic film or tire member facing the thermoplastic film is given a tackifier-adhesive composition containing a polymer component having an absolute value ($\Delta\gamma c$) of the difference of the critical surface tension with the rubber component of the tire member and the polymer component of the surface layer of the thermoplastic film of not more than 6 mN/m, preferably not more than 3 mN/m, respectively.

The tackifier-adhesive of the present invention can be used to simply form a tackifier-adhesive layer by dissolving it in a solvent etc. in advance and coating it on the bonding surfaces by a brush, spray, roller, etc., applying it to the thermoplastic film by a dip roll coater, kiss roll coater, knife coater, etc., or applying it, without using a solvent by coextrusion or lamination at the time of fabrication of the thermoplastic film to fabricate a two-layer film. This tackifier-adhesive layer functions as a tackifier at the time of formation of the tire to improve the working efficiency and to prevent the splice opening and is cross-linked at the time of vulcanization of the tire by the heat at that time to contribute to the adhesion between the rubber and film.

Examples of the unvulcanized rubber/cross-linking agent type tackifier-adhesive used in the present invention are as follows:

The unvulcanized rubber composition is not particularly limited so long as the absolute value of the difference of $\gamma c$ of the rubber component and film component of the tire and polymer used for the tackifier-adhesive is not more than 6 mN/m (the adhesive strength is insufficient when this value is more than 6 mN/m) and may be suitably selected according to the rubber and film components of the tire used. A general unvulcanized rubber composition, for example, natural rubber, SBR, BR, IR, or EPDM unvulcanized rubber composition may be used.

Examples of the cross-linking agent are a general rubber cross-linking agent (vulcanization agent). For example, specifically, a sulfur based such as powdered sulfur, precipitated sulfur, high dispersion sulfur, surface treated sulfur, insoluble sulfur, dimorpholine disulfide, alkylphenol disulfide, etc., for example, in about 1 to 4 phr (parts by weight per 100 parts by weight of rubber component, same below), a peroxide based such as benzoyl peroxide, t-butylhydroperoxide, 2,4-dichlorobenzoyl peroxide, 2,5-dimethyl-2,5-di(t-butylperoxy)hexane, 2,5-dimethylhexane-2,5-di)peroxybenzoate), etc., for example, in 1 to 15 phr, and others such as zinc white (5 phr or so), magnesium oxide (4 phr or so), litharge (10 to 20 phr or so), p-quinone dioxime, p-dibenzoylquinone dioxime, tetrachloro-p-benzoquinone, poly-p-dinitrosobenzene (2 to 10 phr or so), etc.

Examples of the vulcanization accelerator are a general rubber vulcanization accelerator in, for example, 0.5 to 2 phr. Specifically, an aldehyde ammonia based (for example, hexamethylene tetramine), guanidine based (for example, diphenyl guanidine), thiazole based (for example, 2-mercaptobenzothiazole or its Zn salt, cyclohexylamine salt, dibenzothiazyldisulfide), a sulfenamide based (for example, cyclohexylbenzothiazylsulfenamide, N-oxydiethylenebenzothiazyl-2-sulfenamide, N-t-butyl-2-benzothiazolesulfenamide, 2-(thymolpolynyldithio) benzothiazole), a thiuram based (for example, tetramethylthiuram disulfide, tetraethylthiuram disulfide, tetramethylthiuram monosulfide, dipentamethylenethiuram tetrasulfide), a dithio acid salt based (for example, Zn-dimethyldithiocarbamate, Zn-diethyldithiocarbamate, Zn-di-n-butylthiocarbamate, Zn-ethylphenyldithiocarbamate, Te-diethyldithiocarbamate, Cu-dimethyldithiocarbamate, Fe-dimethyldithiocarbamate, pipecolinepipecolyldithiocarbamate), a thiourea based (for example, ethylene thiourea, diethyl thiourea), etc. may be exemplified.

Examples of the vulcanization acceleration adjuvant are a general rubber adjuvant, for example, zinc white (5 phr or so), stearic acid, or oleic acid (3 phr to 4 phr or so).

Examples of the tackifier are any substance used for a general tackifier, adhesive, etc. for example in 10 to 100 phr. Specifically, (a) rosin resins (basic rosins such as gum rosin, tall oil rosin, wood rosin, and other rosins: hydrogenated rosin, unhomogenized rosin, polymerized rosin, maleate rosin) rosin glycerine ester (ester gum), hydrogenated rosin-glycerine ester, and other rosin esters; and (b) terpene phenol resins and other resins having polar groups, resins not having polar groups, for example, α-pinene-based, β-pinene-based, dipentene-based (limonen), and other terpene resins; and aromatic hydrocarbon modified terpenes and other natural substances and their derivatives and for example (c) aliphatic, alicyclic, aromatic, and other petroleum resins; (d) cumarin-indene resins; (e) styrene based, substituted styrene based, and other styrene based resins and other polymer based resins or for example (f) alkylphenol resins, rosin-modified phenol resins, and other phenol type resins; and (g) xylene resins and other condensed resins.

Examples of the solvent are general solvents. Specific examples are aromatic solvents (benzene, toluene, xylene, etc.), aromatic and aliphatic mixtures (M.S.P., S.B.P., Swazol 100, Swazol 200, Benzolallo 40, H.A.W.S., White Spirit, etc.), aliphatic esters (rubber volatile oil, ethyl acetate, etc.), alcohol ketone (methanol, acetone, methylethylketone, methylisobutylketone), etc. It is possible to select the specific solvent among these solvents depending upon the rate of evaporation. These solvents may be used as mixtures of two or more types. The amount of the solvent added should be determined depending upon the viscosity of the tackifier-adhesive. The viscosity is 10 cps to 1000 cps, preferably 50 to 500 cps. When the viscosity is less than 10 cps, the amount of coating will be too small and the adhesive strength will be insufficient, while when over 1000 cps, the handling at the time of coating will be poor.

As other components, when it is necessary to raise the adhesive strength, it is possible to partially mix into the tackifier-adhesive composition an additive reacting with the film material or the rubber material facing the film material or an additive having a critical surface tension closer to the film or the rubber material facing the film material. When using a nylon resin as the material of the thermoplastic film, it is possible to use as the above additive a resorcine-formalin resin, glycoluril resin, etc., while when using a polyester resin, it is possible to use an isocyanate resin etc. The amount of the additive added is preferably 0.5 to 10 parts by weight per 100 parts by weight of the polymer.

Further, when desiring to color the tire, it is possible to add carbon, a coloring agent, etc.

Examples of the polyester polyol/isocyanate based tackifier-adhesive used in the present invention, the following may be exemplified.

That is, as the polyester polyol, there are for example a condensed polyester polyol, lactone-type polyester polyol, polycarbonate diol, etc., but in general a condensed polyester polyol is often used. More specifically, there are ones obtained by a dehydrogenation condensation reaction of adipic acid and glycol and triol such as ethylene adipate, butylene adipate, diethylene adipate, etc. The molecular weight is preferably 3000 or more. When the molecular weight is less than 3000, there is a tendency for the tackiness to be insufficient. A polyester polyol is selected giving an absolute value of $\Delta\gamma r$ of the critical surface tension difference between the rubber component and film component of the tire of not more than 6 mN/m.

Examples of the isocyanate component usable as the cross-linking agent are those which are cross-linked by the heat at the time of vulcanization of the tire. Specific examples are TDI, MDI, crude, MDI, NDI, HDI, IPDI, etc. The ratio of mixture of the polyester polyol and the isocyanate is preferably in the range of an index (—NCO/—OH× 100=) of 50 to 200. Outside of this range, there is poor tackiness, the adhesive strength declines, and the tire members and thermoplastic film are no longer joined.

Catalysts, antioxidants, coloring agents, etc. generally used for urethane may also be suitably mixed in. Further, the above-mentioned tackifiers and solvents may also be used.

Examples of the acrylic acid ester copolymer/organic peroxide tackifier-adhesive used in the present invention are, for example, an acrylic acid ester copolymer (for example, polymers obtained by polymerizing butyl acrylate, 2-ethylhexyl acrylate, ethyl acrylate, and other monomers and copolymers with ethylene etc.) These are generally used as tackifiers before cross-linking by the organic peroxide or isocyanate based cross-linking agent. The polymer has a Tg of 40° C. or less, has tackiness, and typically is represented by the following general formula:

wherein, $R^1$ and $R^2$ are hydrogen atoms or substituent groups selected from $C_{12}$ or less alkyl groups, arakyl groups, and aryl groups, $R^3$ is hydrogen or a $C_5$ or less alkyl group, n and m are integers of 1 or more, and p is 0 or an integer of 1 or more.

Examples of the cross-linking agent of the acrylic acid ester copolymer are general organic peroxide or isocyanate cross-linking agents. Examples of the organic peroxide are benzoyl peroxide, t-butylhydroperoxide, 2,4-dichloro dibenzoyl peroxide, 2,5-dimethyl-2,5 di(t-butyl peroxide)hexane, 2,5-dimethyl hexane-2,5-di(peroxybenzoate), etc. in an amount of 1 to 15 parts by weight per 100 parts of the acrylic acid ester copolymer.

Examples of the isocyanate cross-linking agent are further those which can be cross-linked by the heat at the time of vulcanization of the tire. Specific examples are TDI, MDI, crude MDI, NDI, HDI, IPDI, etc. The ratio of mixture of the polyester polyol and the isocyanate is preferably in the range of an index (—NCO/—OH×100=) of 50 to 200. Outside of this range, there is poor tackiness, the adhesive strength declines, and the tire members and thermoplastic film are no longer joined.

In addition, the above coloring agents, antioxidants, tackifiers, solvents, etc. may be mixed in.

Examples of the modified styrene based copolymer or styrene copolymer and modified polyolefin/cross-linking agent based tackifier-adhesive used in the present invention are modified styrene copolymer such as a styrene-ethylene-propylene copolymer, a styrene-ethylene-butadiene-styrene copolymer, a styrene-ethylene-butadiene copolymer, a styrene-butadiene-styrene copolymer, etc. having a functional group such as an epoxy group, hydroxy group, amino group, carbonyl group, anhydride group.

Further, a styrene copolymer such as a styrene-ethylene-propylene copolymer (SEP), styrene-ethylene-butadiene-styrene copolymers (SEBS), styrene-ethylene-butadiene copolymer (SEB), styrene-butadiene-styrene copolymer (SBS), etc. or a modified polyolefin such as a polyethylene, polypropylene, ethylene-vinyl acetate copolymer, ethylene acrylate copolymer, ethylene-methacrylate copolymer, etc. having an epoxy group, hydroxy group, amino group, carbonyl group, anhydride group, or other functional group may be exemplified. The styrene copolymer and modified polyolefin are preferably used mixed in a ratio by weight of 90/10 to 10/90.

Examples of the cross-linking agent are a general rubber cross-linking agent as explained above. Since the modified styrene based copolymer or styrene copolymer and modified polyolefin polymer used in the present invention are poor in tackiness, to use these as tackifier-adhesives, it is necessary to mix in a tackifier to impart tackiness between the tire rubber member and thermoplastic film.

Examples of the tackifier mixed in are the rosin resin, terpene resin, petroleum resin, cumarin-indene resin, styrene resin, phenol resin, xylene resin, etc. mentioned above. Those selected should be one close in the Sp value of the tackifier-adhesive polymer, Sp value of the tire rubber member, and Sp value of the thermoplastic film. In particular, a terpene phenol resin and rosin ester resin are act effectively with respect to polymers with an Sp value of 7.5 to 9.5 and have a high tackiness, and therefore, can be optimally used for the tackifier-adhesive in the present invention. Further, it is possible to use similar antioxidants, coloring agents, tackifiers, and solvents as explained above.

Figure 1:
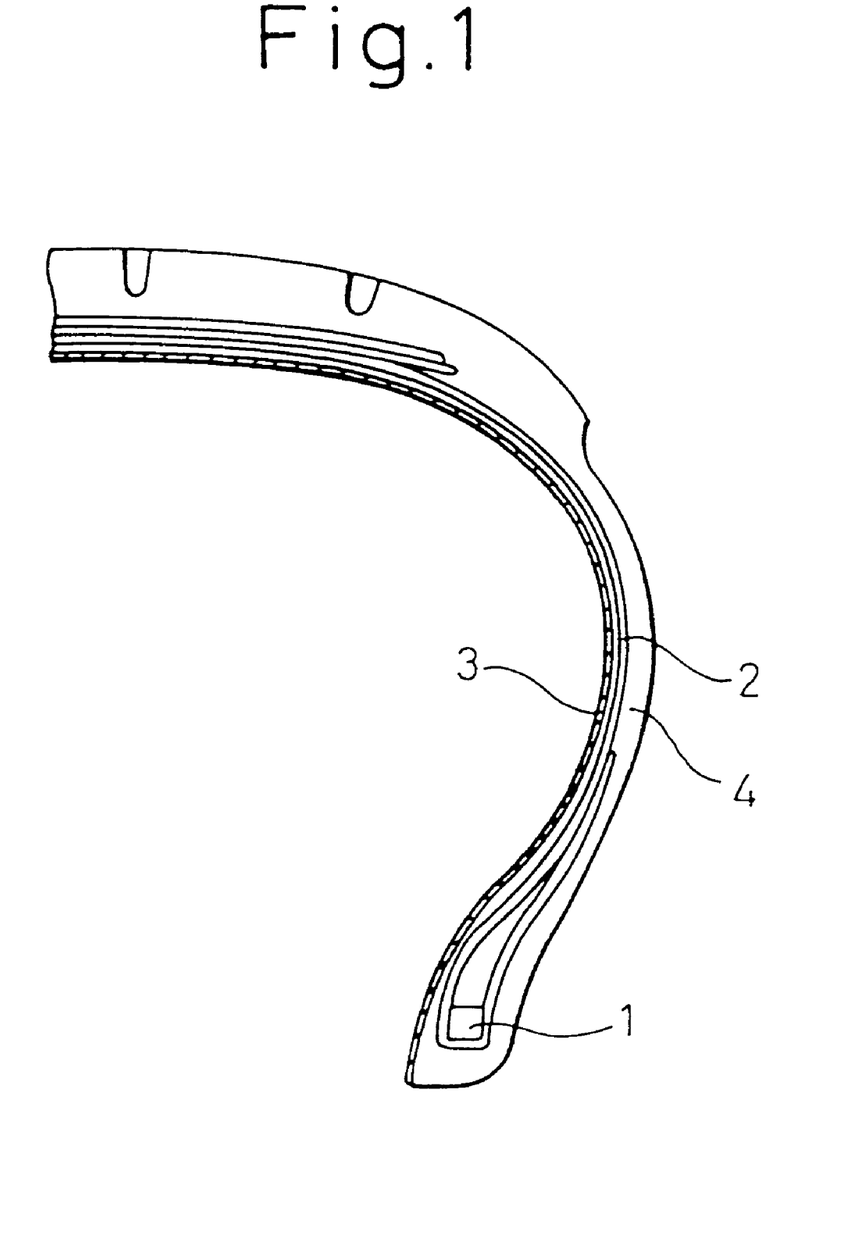
FIG. 1 is a semi-sectional explanatory view in the meridial direction of part of the inner liner portion of the pneumatic tire of the present invention.

FIG. 1 is a semi-sectional view in the meridial direction showing a typical example of the arrangement of the air permeation preventive layer of the pneumatic tire. In FIG. 1, a carcass layer 3 bridges a pair of left and right bend cores 1, 1. The air permeation preventive layer 3 is provided at the inner surface of the tire at the inside of the carcass layer 2. This air permeation preventive layer 3 is comprised of a thermoplastic film in the present invention. In FIG. 1, 4 shows a sidewall.

The process for molding a pneumatic tire according to the present invention will now be explained.

When using conventional tire materials to mold a green tire, there is already a suitable tackiness which is desireable in terms of working efficiency. However, when using a thermoplastic film material etc., the tackiness tends to be insufficient and the working efficiency to be poorer. In particular, there is a problem in that the lack of tackiness causes a reduction in the working efficiency in the process for wrapping a strip of film around the molding drum. As opposed to this, when coating a tackifier-adhesive in advance on the joining surface of the strip of film (coating in process before molding or coating at the time of molding), a suitable tackiness is given and the working efficiency does not drop. For example, when the tackiness is less than 5N, the splice portion will open during the molding process (in particular the inflation process) and it will become impossible to cover the entire inner surface of the tire by an air permeation preventive layer or the rising portion of the joined layers will trap air at the time of vulcanization and end up not being given a sufficient adhesive strength.

On the other hand, when the tackiness is more than 30N, the tackiness is excessive, so when trying to correct some trouble after once joining the members, the joined surfaces will not cleanly peel apart. When attempting to forcibly peel them apart, the strip of film will be caused to deform and will end up no longer suitable for use. Therefore, considering the elongation of the strip of film etc., a tackiness of 30N is the limit.

Note that by providing a cylindrical thermoplastic film material, there is no danger of opening of the joined portions as explained above.

In the process for molding a green tire, the inner liner layer is first wrapped over the drum, then the carcass material, bead material, sidewall material, etc. are successively laid on top. These rubber members and thermoplastic film material do not require as strong a tackiness as when joining the liner. However, compared with the conventional rubber liner layer, when the property of the highly rigid thermoplastic film is used, it is known that the tire uniformity is improved.

That is, the inner liner, carcass, bead, sidewall, and other members wrapped on the drum are inflated for application of the belt and cap tread. At this time, the green tire deforms considerably, but the joins of the members are locally high in rigidity and therefore the joins deform relatively slightly at the time of inflation. This causes deterioration of the tire uniformity.

On the other hand, since the thermoplastic film has a high modulus of elasticity of 10 to 500 MPa or so, it acts to ease the difference in deformation at the joins of the members other than the inner liner. However, in this case, there is no meaning unless the thermoplastic film and other members are joined by a strong tackiness.

With a tackiness of less than 5N, there is no effect of improvement of the uniformity, while when over 30N, the work efficiency tends to deteriorate for the same reasons as given above.

In the present invention, the tackifier-adhesive may be coated over the entire surface or part of the contact surfaces of the film and other members. When coated at least over 30 percent of the surfaces, there is an effect of improvement of the uniformity. However, when coated partially, it is preferable that the tackiness (N)×rate of area coated (%)≧450.

EXAMPLES

The present invention will now be explained in further detail by Examples, but of course the scope of the present invention is not limited to these Examples.

Examples 1 to 7 and Comparative Examples 1 to 2

Preparation of Adhered Member

A three-layer film having a thickness of 50 μm comprised of an ethylene/vinyl alcohol copolymer as a thermoplastic film on whose two sides are laminated polyethylene is used. Further, a sheet having 2 mm thickness obtained by kneading a general carcass formulation shown below by an open roll and molding it at 100° C. at 10 MPa was used as the rubber material.

| Component | Parts by weight |
|---|---|
| Natural rubber | 80 |
| SBR | 20 |
| FEF carbon black | 50 |
| Stearic acid | 2 |
| Zinc oxide | 3 |
| Sulfur | 3 |
| Vulcanization accelerator (BBS)* | 1 |
| Aromatic oil | 2 |

*N-t-butyl-2-benzothiazylsulfenamide

Preparation of Tackifier-adhesive

The components shown in Table 1, except for the solvent, were kneaded for 10 minutes by an open roll, then the solvents were added and the mixtures agitated at an ordinary temperature for 5 hours to prepare the tackifier-adhesives of Examples 1 to 7 and Comparative Example 1.

TABLE I

| | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Component of formulation (part by weight) | | | | | | | | | |
| Natural rubber*1 | 100 | 100 | — | — | — | — | — | — | — |
| Epoxylated natural rubber*2 | — | — | 100 | — | — | — | — | — | — |
| Polyacryl rubber*3 | — | — | — | 100 | — | — | — | — | — |
| Polybutadiene*4 | — | — | — | — | 100 | — | — | — | — |
| Polyester polyol*5 | — | — | — | — | — | 100 | — | — | — |
| IIR*6 | — | — | — | — | — | — | — | 100 | — |
| Ethytene-ethyl acrylate copolymer*7 | — | — | — | — | — | — | 100 | — | — |
| Aliphatic hydrocarbon*8 | 20 | — | 60 | 40 | 60 | 30 | 60 | 40 | — |
| Crude MDI*9 | — | — | — | — | — | 5 | — | — | — |
| Dicumyl peroxide | — | — | — | — | — | — | 1 | 1 | — |
| FEF black | 10 | 10 | 10 | 10 | 10 | 10 | 10 | 10 | — |
| Sulfur | 2 | 2 | 2 | 0.5 | 2 | — | — | 2 | — |
| Zinc oxide | 5 | 5 | 5 | 5 | 5 | — | — | 5 | — |
| Stearic acid | 2 | 2 | 2 | 1 | 2 | — | — | 2 | — |
| DM*10 | 0.7 | 0.7 | 0.7 | — | 0.7 | — | — | 0.7 | — |
| TETA*11 | — | — | — | 1.5 | — | — | — | — | — |
| Toluene | 400 | 400 | 400 | 400 | 400 | 20 | 400 | 400 | — |
| MEK | 100 | 100 | 100 | 100 | 100 | 40 | 100 | 100 | — |
| n-hexane | 100 | 100 | 100 | 100 | 100 | 20 | 100 | 100 | — |
| Critical surface tension (mN/m) | | | | | | | | | |
| Adhered member (rubber) polymer | 35 | 35 | 35 | 35 | 35 | 35 | 35 | 35 | — |
| Film polymer | 34 | 34 | 34 | 34 | 34 | 34 | 34 | 34 | — |
| Tackifier-adhesive polymer | 36 | 36 | 36 | 35 | 31 | 34 | 37 | 27 | — |
| Critical surface tension difference | | | | | | | | | |
| Film/tackifier-adhesive | −2 | −2 | −2 | −1 | 3 | 0 | −3 | 7 | — |
| Rubber/tackifier-adheisve | −1 | −1 | −1 | 0 | 4 | 1 | −2 | 8 | — |

TABLE I-continued

|  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Tackiness test result (N) | | | | | | | | | |
| Film/tackifier-adhesive/film | 19.2 | 16.3 | 20.6 | 17.7 | 15.1 | 16.1 | 16.2 | 2.2 | 0 |
| Film/tackifier-adhesive/rubber | 19.5 | 16.2 | 20.5 | 17.3 | 14.9 | 15.9 | 16.1 | 2.5 | 2.1 |
| Adhesion test result (N/cm) | | | | | | | | | |
| Film/tackifier-adhesive/film | 33.6 | 34.5 | 30.4 | 31.2 | 11.2 | 10.4 | 17.7 | 2.1 | — |
| Film/tackifier-adhesive/rubber | 32.5 | 35.1 | 31.2 | 30.8 | 10.8 | 10.6 | 16.8 | 2.2 | — |
| Tackifier-adhesive viscosity (CPS) | 200 | 180 | 340 | 140 | 150 | 220 | 110 | 140 | — |

Notes to Table I
*1: SMR-L
*2: ENR-25 (Malaysia Rubber Bureau)
*3: Hycar 4021 (Nippon Zeon)
*4: Nipol BR1220 (Nippon Zeon)
*5: VYLON 200 (Toyobo) molecular weight 20000
*6: JSR Butyl 268 (Japan Synthetic Rubber)
*7: EEA/DPDJ-6169 (Nippon Unicar)
*8: Quintone A-100 (Nippon Zeon)
*9: Sumidur 44V-10 (Sumitomo Bayer Urethane)
*10: Nocceler-DM (Ouchi Shinkyo Chemical Industry)
*11: Triethylene tetramine (reagent)

The critical surface tensions of the rubber adhered members, thermoplastic films, and tackifier-adhesives and the differences thereof are as shown in Table I. The measurement of the viscosity, tackiness tests, and adhesion tests on the thus obtained rubber adhered members, thermoplastic films, and tackifier-adhesives were performed as follows:

Measurement of Viscosity of Tackifier-adhesive

The viscosities of the tackifier-adhesives of the above formulations were measured at 25° C. using a Type-E viscometer made by Tokyo Keiki.

Tackiness Test

The tackifier-adhesive of the above formulation was applied by brushing to the film or rubber sheet which was then set at the bottom of the measurement device. After drying for 20 seconds after application, the film attached at the top sample mounting position of the measurement device was pressed together with it. The force for peeling this off was used as the tackiness. The measurement was performed in two ways: with the film/tackifier-adhesiive/film and with the film/tackifier-adhesive/rubber. The measurement device was the PICMA tack tester made by Toyo Seiki Seisakusho and the measurement was conducted under the following conditions:

Measurement Conditions:
Reference sample (top) dimensions: 12.7 mm×152 mm
Prtessing force: 4.90N
Peeling speed: 120 mm/min
Pressing time: 0 s
Temperature: 20° C.
Humidity: 65%

Adhesion Test

A tackifier-adhesive of the above formulation was coated on a rubber sheet or film and allowed to dry for 20 seconds. The film was then placed on top and pressed at 180° C. for 10 minutes to cross-link the rubber and tackifier-adhesive. The sample was used for the T-type peeling test of JIS K-6854.

The results of the measurement of the viscosity, tackiness test, and adhesion test are shown in Table I.

Comparative Example 2 shows the results of a tackiness test performed without using a tackifier-adhesive.

Examples 8 to 12 and Comparative Example 3

Preparation of Adhered Member 100 parts by weight of Br-IPMS[*1] were pelletized by a rubber pelletizer. Next, the formulations shown below were kneaded by a biaxial kneader and pelletized by a resin pelletizer, then used to form thermoplastic films of a thickness of 0.1 mm by a T-die extruder. The surface layers of the films at this time were confirmed to be nylon 11. The rubber materials used were the same ones as used in Examples 1 to 6.

| Component | Parts by weight |
|---|---|
| Nylon 11[*2] | 40 |
| Br-IPMS[*1] | 60 |
| Zinc oxide | 0.3 |
| Stearic acid | 1.2 |
| Zinc stearate | 0.6 |

[*1]Exxpro 90-10 (Exxon Chemical): Isobutyleneparamethylstyrene copolymer bromide
[*2]Lilsan BESN O TL (Atochem)

Preparation of Tackifier-Adhesive

For Examples 8 to 11, the formulations shown in Table II were kneaded at 120° C. by a biaxial kneader, then used to form tackifier-adhesive films of 0.03 mm thickness by a T-die extruder. Note that for Example 12 and Comparative Example 3, the tackifier-adhesive was prepared in the same way as with Examples 1 to 7.

The critical surface tensions of the rubber adhered members, thermoplastic films, and tackifier-adhesives and the differences between the same are shown in Table II.

The tackiness test and adhesion test of the obtained rubber adhered members, thermoplastic films, and tackifier-adhesives were performed as follows:

Tackiness Test

The tackifier-adhesive films of Examples 8 to 11 were attached at the bottom of the measurement device or the thermoplastic film or rubber sheet at the top of the measurement device, then were pressed in the same way as in Examples 1 to 7 and the force at the time of peeling found.

For Example 12 and Comparative Example 3, the same procedure was followed as with Examples 1 to 7.

Adhesion Test

For Examples 8 to 11, tackifier-adhesive films were inserted between the rubber sheet/film or the film/film. The assemblies were pressed at 180° C. for 10 minutes, then used for the T-type peeling test. For Example 12 and Comparative Example 3, the same procedure was followed as with Examples 1 to 7.

oil were mixed in a hermetic mixer to prepare a master batch which was then pelletized by a rubber pelletizer. Next, the formulation shown in the table was kneaded by a biaxial kneader and pelletized by a resin pelletizer, then extruded by a T-die to form a strip-like film having a width of 360 mm and a thickness of 0.1 mm. The surface layer of the film at this time was confirmed to be EVOH. Further, the critical surface tension of the film was 38 mN/m. The film was wrapped around the tire molding drum, the splice portion (Example 13) or full surface (Example 14) was coated with

TABLE II

|  | Ex. 8 | Ex. 9 | Ex. 10 | Ex. 11 | Ex. 12 | Comp. Ex. 3 |
|---|---|---|---|---|---|---|
| SBS*1 | 50 | 30 | 50 | — | — | — |
| Epoxylated ethylene-viny acetate polymer*2 | 50 | 70 | — | — | — | — |
| Maleic-acid modified ethylene-ethyl acrylate *3 | — | — | 50 | — | — | — |
|  | — | — | — | 100 | — | — |
| Epoxy-modified SBS*4 | — | — | — | — | 80 | — |
| Natural rubber | — | — | — | — | 20 | — |
| SBR*5 | — | — | — | — | 20 | — |
| Polyester polyol | — | — | — | — | — | — |
| Aliphatic hydrocarbon | — | — | — | — | — | 100 |
| Rosin ester*6 | 50 | 50 | 50 | 50 | — | 30 |
| Crude MDI | — | — | — | — | — | — |
| FEF black | — | — | — | — | 10 | 5 |
| Sulfur | — | — | — | — | 2 | 10 |
| Zinc oxide | — | — | — | — | 5 | — |
| Stearic acid | — | — | — | — | 2 | — |
| Peroxide*7 | 5 | 5 | 5 | 5 | — | — |
| DM | — | — | — | — | 0.7 | — |
| Resorcine-formalin resin*8 | — | — | — | — | 8 | — |
| Butylated glycoluril resin*9 | — | — | — | — | 3 | — |
| Toluene | — | — | — | — | 600 | 80 |
| Critical surface tension (mN/m) |  |  |  |  |  |  |
| Adhered member (rubber) polymer | 35 | 35 | 35 | 35 | 35 | 35 |
| Film polymer | 42 | 42 | 42 | 42 | 42 | 42 |
| Tackifier-adhesive polymer | 36 | 37 | 38 | 38 | 36 | 34 |
| Critical surface tension difference (mN/m) |  |  |  |  |  |  |
| Film/tackifier-adhesive | 6 | 5 | 4 | 4 | 6 | 8 |
| Rubber/tackifier-adhesive | −1 | −2 | −3 | −3 | −1 | 1 |
| Tackness test result (N) |  |  |  |  |  |  |
| Film/tackifier-adhesive/film | 23.1 | 24.5 | 20.5 | 20.2 | 25.6 | 4.1 |
| Film/tackifier-adhesive/rubber | 22.2 | 23.5 | 20.2 | 20.1 | 25.3 | 4.8 |
| Adhesion test result (N/cm) |  |  |  |  |  |  |
| Film/tackifier-adhesive/film | 42.5 | 38.2 | 35.6 | 40.1 | 29.2 | 3.6 |
| Film/tackifier-adhesive/rubber | 41.1 | 39.1 | 35.2 | 40.5 | 28.3 | 3.3 |

*1: Kraton D KX65CS (Shell)
*2: BONDFAST 20B (Sumitomo Chemical)
*3: N Polymer A1600 (Nihon Sekiyu Kagaku)
*4: ESBS ATO1S (Daicel Chemical Industries)
*5: Nipof 1502 (Nippon Zeon)
*6: PENSEL AD (Arakawa Chemical)
*7: Perkadox 14-40 (Akzo)
*8: Penacolite Resin B-18-S (Indospec Chemical)
*9: Cymel 1170 (Mitsui Cyanamide)

From the above results, it is seen that, when the absolute value of the difference of the critical surface tension becomes more than 7 mN/m, the tackiness and adhesive strength between the substrate and tackifier-adhesive both fall to levels leading to poor work efficiency at the time of molding the tire, tire defects, etc.

Examples of the use of the tackifier-adhesive and formation of the tire will now be shown.

Examples 13 and 14

100 parts by weight of Br-IPMS*1, 60 parts by weight of carbon (GPF*2), and 20 parts by weight of paraffinic process the tackifier-adhesive used in Example 1, then the tire members laid on top and the assembly inflated to form the green tire. This was then vulcanized to form a tire of a tire size 165SR13. After the fabrication of the tire, the finished tire was examined to see if there are any abnormalities. Further, the finished tire was measured as to its weight and air leakage at the same time.

When the time for molding the green tire by Example 13 was measured, the working time was was found to be about 1 minute.

| Component | Part by weight |
|---|---|
| EVOH*[3] | 50 |
| Rubber master batch | 90 |
| Zinc oxide | 0.25 |
| Stearic acid | 1 |
| Zinc stearate | 0.5 |

*[1]EXXKPRO 90-10 (Exxon Chemical): Isobutyleneparamethylstyrene copolymer bromide
*[2]Seast V (Tokai Carbon)
*[3]Eval EPE153B (Kurarey)

Test Method for Tire Air Leakage

A 165SR13 steel radial tire (rim 13×41/2-J) was used. This was allowed to stand for three months under conditions of an initial pressure of 200 kPa and no load at a room temperature of 21° C. The pressure was measured every 4 days.

The value α was found by regression to the following function:

$$Pt/Po = \exp(-\alpha t)$$

where Pt is the measurement pressure, Po is the initial pressure, and t is the number of elapsed days. The obtained value α is used and t=30 inserted to obtain:

$$\beta = [1-\exp(-\alpha t)] \times 100$$

The value β is made the amount of tire air leakage air month (%/month).

Example 15

A thermoplastic film using as a matrix the N11 used in Examples 8 to 12 was formed by extrusion by a T-die (width of 360 mm and thickness of 0.1 mm) and wound up in a roll. When next fabricating the tackifier-adhesive film of Example 8 by a T-die, the thermoplastic film was laminated on a roll to prepare a two-layer film comprised of the thermoplastic film layer and tackifier-adhesive layer.

The two-layer film was wrapped on the tire molding drum, then the tire members laid on top to form the tire in the same way as Examples 11 and 12. The tire weight and air leakage were measured at the same time.

Example 16

The film formation used in Example 13 was mixed and pelletized by a biaxial extruder, then inflation molded to fabricate a cylindrical film of a diameter of 345 mm and a thickness of 0.1 mm. This was fitted over the tire molding drum. The entire surface was coated with the tackifier-adhesive used in Example 1 and a tire fabricated and evaluated in the same way as in Example 13.

Comparative Example 4

The strip of film used in Example 13 was wrapped around the tire drum and a tire fabricated and evaluated in the same way as in Example 13 except without using a tackifier-adhesive. Here, the time for forming the green tire by Comparative Example 4 was measured and was found to be 1 minute 20 seconds due to the correction of the relative positions of the film splice portion and carcass. This was 20 seconds more then the work time of Example 13.

Comparative Example 5

A tire with an inner liner fabricated by a usual butyl rubber composition was evaluated.

The results of the above evaluation are shown in Table III.

TABLE III

| | | Ex. 13 | Ex. 14 | Ex. 15 | Ex. 16 | Comp. Ex. 4 | Comp. Ex. 5 |
|---|---|---|---|---|---|---|---|
| Film shape | | Strip | Strip | Strip | Cylinder | Strip | — |
| Position coated by tackifier-adhesive | | Splice portion | Full surface + splice portion | Full surface + splice portion | Full surface + | None | — |
| Critical surface tension difference Δγc (mN/m) | Film/tackifier-adhesive | 2 | 2 | 6 | 2 | — | — |
| | Rubber/tackifier-adhesive | −1 | −1 | −1 | −1 | — | — |
| Defects at time of molding (splice opening) | | None | None | None | None | Yes | None |
| Tire weight*1 | | 93 | 93 | 94 | 93 | 93 | 100 |
| Air leakage (%/month) | | 2.8 | 2.8 | 2.7 | 2.8 | — | 3 |

*1: Weight when indexed against tire of Comparative Example 4 as 100.

From the results of Table III, it is clear that by using the tackifier-adhesive for at least the splice portion of the thermoplastic film, the splice opening at the time of the formation of the tire is eliminated and it becomes possible to form a good tire.

Further, compared with a tire not using a tackifier-adhesive as in Comparative Example 4, when a tackifier-adhesive is used, the tackiness enables the thermoplastic film to be easily affixed on the molding drum and therefore the work time to be reduced. This was also proved to be extremely effective for the work efficiency.

In this way, the finished tire had the merit of a 6 to 7% reduction of weight and further less air leakage compared with a usual tire (Comparative Example 5).

By applying the tackifier-adhesive to the splice portion and the entire surface of the film, the problem of the splice portion opening at the time of formation of the tire was eliminated. Further, the tackiness of the splice portion enables the film to be easily affixed on the molding drum, so the work efficiency was improved as well.

The thus finished tire achieved a 6 to 7 percent reduction in weight from the current ones and was also improved in air leakage.

Example 17

Using the cylindrical liner used in Example 16, 165SR13 steel radial tires (rim: 13×41/2-J) were tested for uniformity with the tackifier-adhesive of Example 1 coated on 25, 30, 80, 90, and 100 percent of the surface area of the linear. The results are shown in Table IV together with the tackiness values.

TABLE IV

|  | Thermoplastic film liner | | | | | | | Conventional butyl rubber liner |
| --- | --- | --- | --- | --- | --- | --- | --- | --- |
|  | A | B | C | D | E | F | G |  |
| Tackiness N | 4 | 5 | 5 | 5 | 20 | 20 | 20 | — |
| Rate of surface coated (%) | 100 | 80 | 90 | 100 | 25 | 30 | 100 | — |
| Uniformity (index) (n = 20) | 100 | 100 | 98 | 97 | 100 | 95 | 88 | 100 |

Note: The uniformity test was conducted by the method of JASO C607-97 "Uniformity Test Method for Automobile Tires" wherein the RFV value was measured and expressed indexed to a conventional product as 100. The smaller the value, the better the uniformity.

INDUSTRIAL APPLICABILITY

As explained above, according to the present invention, since there is provided a process for production of a pneumatic tire using for an air permeation preventive layer a strip-shaped or cylindrical-shaped single-layer or multiple-layer thermoplastic film, comprised of applying to at least part of the joining portion of the thermoplastic film or tire member facing the thermoplastic film a tackifier-adhesive composition containing a polymer component having an absolute value of the difference of the critical surface tension with the rubber component of the tire member and the polymer component of the surface layer of the thermoplastic film of not more than 6 mN/m, respectively, there is no opening of the splice portion, and the work efficiency can be improved.

LIST OF REFERENCES

1 . . . Bead core
2 . . . Carcass layer
3 . . . Air permeation preventive layer
4 . . . Sidewall

What is claimed is:

1. In a process for producing a pneumatic tire having an inner tire member containing a rubber component and, as an air permeation preventive layer, a strip-shaped single-layer or multiple layer film, said film extending circumferentially around and having one surface in contact with an inner side of said tire member, said film further having a joining portion where facing portions on two ends of the strip-shaped film meet and overlap to form said layer, the improvement comprising:

said strip-shaped film being composed of an elastomer dispersed in a continuous thermoplastic resin and applying to at least a part of the facing portions of said ends at the joining portion of said strip-shaped film and to at least a part of said one surface of said film a tackifier-adhesive composition containing a polymer component, said polymer component of said tackifier-adhesive composition having a critical surface tension difference with the rubber component of the tire member and with said one surface of the film of not more than 3 mN/m, wherein the tackiness between both the facing portions of said two ends of the strip-shaped film at the joining portion of the film and between said one surface of the film and the rubber component of the tire member is from 5 to 30N as determined from a sample having a width of 12.7 mm.

2. In a process for producing a pneumatic tire having an inner tire member containing a rubber component and, as an air permeation preventive layer, a cylindrical-shaped single-layer or multiple layer film, said film extending circumferentially around and having one surface in contact with an inner side of said tire member to form said layer, the improvement comprising:

said cylindrical-shaped film being composed of an elastomer dispersed in a continuous thermoplastic resin and applying to at least a part of said one surface of said film a tackifier-adhesive composition containing a polymer component, said polymer component of said tackifier-adhesive composition having a critical surface tension difference with the rubber component of the tire member and with said one surface of the film of not more than 3 mN/m, wherein the tackiness between said one surface of the film and the rubber component of the tire member is from 5 to 30N as determined from a sample having a width of 12.7 mm.

3. The process of claim 1 or 2, wherein the tackifier-adhesive composition contains an unvulcanized rubber and a cross-linking agent for the unvulcanized rubber.

4. The process of claim 1 or 2, wherein the tackifier-adhesive composition contains a polyol having a polyester structure having a number average molecular weight of at least 3000, an isocyanate based cross-linking agent, and a tackifier.

5. The process of claim 1 or 2, wherein the tackifier-adhesive composition contains an acrylic acid ester copolymer, an organic peroxide based cross-linking agent or isocyanate based cross-linking agent and a tackifier.

6. The process of claim 1 or 2, wherein the tackifier-adhesive composition contains a modified styrene copolymer or a mixture of a styrene copolymer and modified polyolefin, a cross-linking agent, and a tackifier.

7. A tire produced by the process of claim 1 or 2, wherein the single-layer or multiple-layer film has a Young's modulus of from 1 to 500 MPa.

8. A tire produced by the process of claim 1 or 2, wherein the single-layer or multiple-layer film has a Young's modulus of from 1 to 300 MPa.

9. The process of claim 1, wherein the tackiness between both the facing portions of said two ends of the strip-shaped film at the joining portion of the film and between said one surface of the film and the rubber component of the tire member is from 14.9 to 30N as determined from a sample having a width of 12.7 mm.

10. The process of claim 2, wherein the tackiness between said one surface of the film and the rubber component of the tire member is from 14.9 to 30N as determined from a sample having a width of 12.7 mm.

* * * * *